Feb. 11, 1936.    J. H. FRIEDMAN    2,030,290
METHOD AND APPARATUS FOR MAKING HEADED BLANKS AND RESULTANT ARTICLE
Filed July 11, 1933
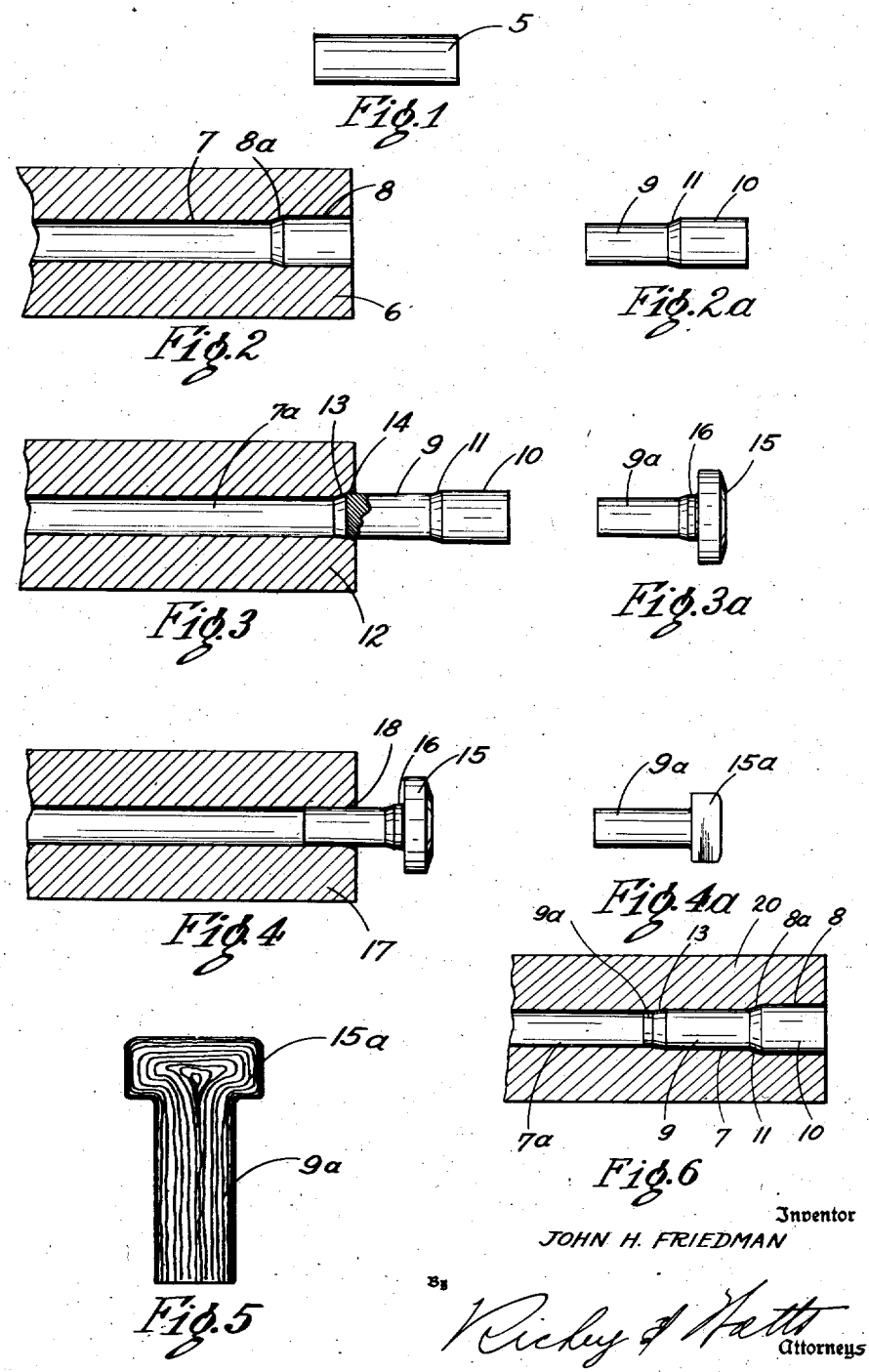
Inventor
JOHN H. FRIEDMAN Patented Feb. 11, 1936

2,030,290

UNITED STATES PATENT OFFICE 2,030,290

METHOD AND APPARATUS FOR MAKING HEADED BLANKS AND RESULTANT ARTICLE

John H. Friedman, Tiffin, Ohio, assignor to The National Machinery Company, Tiffin, Ohio, a corporation of Ohio Application July 11, 1933, Serial No. 679,933

22 Claims. (Cl. 10—27)

This invention relates to headed blanks, bolts and the like, and a method of manufacturing the same.

It has heretofore been proposed to manufacture bolts by extruding a part of a length of wire or rod stock to a diameter substantially equal to the overall diameter of the threads of the finished article, then extruding a part of the length of the portion so reduced to a diameter substantially equal to the pitch diameter of the threads of the article, and upsetting the unreduced portion to form a polygonal or other shaped head, or a round head which may subsequently be trimmed to the desired polygonal shape. With this method, a head of the necessary size with respect to the diameter of the shank is completely upset or worked in one operation, which is highly desirable since the flow lines and metal fibers then conform to the contour of the blank.

When the head is only partially upset or deformed in one blow and then completely upset or further deformed by subsequent blows, the grain structure includes fibers and flow lines in the form of re-entrant curves in the head, resulting in a plane of weakness in the metal. There is, however, a definite limit to the length of stock that can be gathered and upset in relation to the diameter of the stock. For most purposes the maximum size head that can be formed in one blow on material of shank diameter is undersize with respect to the shank, an objectionable feature which is overcome by the extrusion method.

Heretofore, as far as known, it has been considered impractical if not impossible by the extrusion method to produce bolts of that type which have a shank portion of equal threading diameter from the free end to the base of the head of the blank, or a blank having a threading shank portion which is practically devoid of a shoulder or annular unthreaded portion at the joint between the head and shank. Since some form of guide and axially alining means for the blank lengths is required when the latter are pushed into the dies and extruded, it is necessary to provide a straight annular axially alining portion in advance of the tapered throat of each die. In the first die, the cavity or annular recess which defines the head portion of the blank may serve to axially aline the blank when it is extruded, but in the second die, where the shank is finally extruded or reduced and the head portion upset, the die is of necessity provided with a cylindrical axially alining portion in advance of the throat and this portion forms a shoulder or annular enlargement on the blank at the joint between the head and shank. Thereafter, the upset head of the blank is trimmed (assuming it has not been upset to the desired shape) and the shank threaded, leaving the said enlargement adjacent the joint unthreaded. There are certain uses for bolts wherein such enlarged and/or unthreaded portion is undesirable.

The present method is in the nature of an improvement with respect to the extrusion method above discussed, in that it provides for the production of bolt blanks each of which have a shank whose cross-sectional diameter equals the pitch diameter of the threads throughout the length thereof, or is substantially devoid of a shoulder at the joint between the head and shank. Thus a blank or bolt is produced having the relatively large head with respect to the shank and the regular grain fibers or flow lines which result from the extrusion method, while at the same time the objectionable enlargement on the shank adjacent the head is eliminated. The term shank as used herein is intended to mean that part of the bolt exclusive of the head portion and it will be understood that the shank may be threaded throughout its length or partially threaded as desired.

Accordingly an important feature of the invention is to provide a bolt blank having a shank extruded throughout its entire length to a diameter corresponding to the pitch diameter of the threads in the finished article and an upset head having a diameter greater with respect to the diameter of the extruded shank than can be successfully produced by a single upsetting blow on stock material of shank diameter. The invention also includes the provision of a method and means for producing an article having the characteristics of the full sized head formed by a single blow and the shank extruded throughout its entire length to the pitch diameter of the threads in the finished article. Generally stated, one method consists in drawing or extruding a portion of a length of stock of cross-sectional area greater than that of the shank of the blank to form a round cross section of a diameter substantially equal to the over-all diameter of the threads of the finished article, further drawing or extruding a portion of said round cross section to a diameter substantially equal to the pitch diameter of the threads and upsetting the unreduced portion of the stock to form a head leaving an annular unreduced joint portion between the head and shank, and reducing said joint portion to a diameter equal to the shank.

A variation of the above method and also embodying my broad invention contemplates the full reduction of a part of the blank from stock diameter to pitch diameter in one die permitting a reduction in the number of dies and operations necessary to produce a finished blank. To better illustrate the method, I have shown in the drawing a set of dies arranged to carry out a preferred sequence of operations. It will be obvious, however, that such arrangement and sequence need not necessarily be followed in exact detail in practically carrying out the method within the scope of the invention.

In the drawing:

Figure 1 shows a length of stock for a bolt blank;

Fig. 2 is a central longitudinal section through an extrusion die, which in the example illustrated is the first die of a series of three for carrying out the method, and Fig. 2a shows the length of stock after being extruded in said die;

Fig. 3 is a view similar to Fig. 2 of an extrusion and heading die, which is the second die of the series, and Fig. 3a shows the blank from this die;

Fig. 4 is a view similar to Figs. 1 and 2 of the final extrusion die, which in this instance also serves as a trimming die, and Fig. 4a shows the completed blank ready for the pointing and threading operations;

Fig. 5 is an enlarged cross sectional view of the blank of Fig. 4a, showing diagrammatically the regular lines of the grain structure or metal fibers; and Fig. 6 is a central longitudinal sectional view of what I term a double-duty type of die with an extruded blank therein.

In Fig. 1, I show a length of stock 5, which may be cut from suitable wire or rod stock of a cross-sectional diameter greater than the shank of the blank to be formed. Fig. 2 illustrates an extrusion die 6 which is formed with a shank receiving portion 7 and an enlarged portion 8 which terminates in a tapered extrusion portion 8a. It will be noted that the enlarged portion 8 is of the same diameter as the stock 5 and thereby serves to center the shank portion axially with respect to the head portion during the extrusion operation. In Fig. 2a, the partially formed blank is shown after being acted on by the die 6, the shank 9 of the blank having been reduced to a diameter substantially equal to the overall diameter of the threads of the finished bolt. The unreduced portion 10 is subsequently upset into the head of the blank. Between the shank 9 and the unreduced portion 10, a tapered joint 11 is formed by the tapered portion 8a of the die. After being partially extruded in the die 6, the blanks are transferred to the die 12, at which point the shank 9 of the blank is further extruded or reduced to a diameter equal to the pitch diameter of the threads of the completed bolt and the head portion of the blank upset, the reduced shank and upset head being respectively indicated at 9a and 15, Fig. 3a.

In this second operation, the die 12 as here shown is designed to serve as a combined extrusion and heading die. The entrance portion or throat of the die 12 is provided with a tapered extrusion portion 13 and a substantially straight enlarged axially alining portion 14, the latter being of the same diameter as the portion 9 of the blank and serving to ensure proper extrusion and axial alinement of the shank with respect to the head 15 when the header slide advances and upsets the portion 10 of the blank to form said head. This portion 14 of the die 12 results in an annular shoulder 16 being formed on the blank adjacent the head 15, note Fig. 3a. The shank receiving portion of the die 12 is indicated at 7a.

The tapered joint 11 and annular shoulder 16 have heretofore been considered necessary formations in the production of all types of bolts by the extrusion method over which the present invention is an improvement. To eliminate this shoulder formation at the joint between the head and the shank, I have provided a further extrusion step which is carried out in the die 17. This die 17 may also serve as a holder for the blank for a trimming punch carried by the header slide and not here shown. The throat of the die 17 is formed with a slight taper, as at 18, just sufficient to provide for effective extrusion of the blank. The bore of the die 17 is made of the same diameter as the final shank portion 9a so as to fit the shank portion and accurately guide and align the blank. When the header slide advances and pushes the blank into the die 17, the shoulder portion 16 is finally extruded to the diameter of the shank 9a. The slight taper remaining at the joint between the shank and the head of the blank due to the tapered portion 18 at the throat of the die is so slight as to be of no material consequence. Simultaneously with this final extrusion step, the head of the blank may be trimmed to the desired shape as at 15a, Fig. 4a. It will be obvious, however, that in case the head is upset to the desired shape, or in the production of round-headed bolts, the trimming operation would not be required in which event the die 17 could serve solely as an extrusion or reducing die or be utilized in conjunction with other bolt-making operations instead of being a combined extrusion die and holder for the blank when subjected to the trimming operation, as in the present instance.

In Fig. 6 I show what may be termed a double-duty die 20, by the use of which the die 12, Fig. 3, may be eliminated. This die 20 is provided with an enlarged head portion 8, a tapered portion 8a, shank-forming portions 7 and 7a, and a tapered extrusion portion 13, which correspond to the similarly designated portions of the dies 6 and 12, Figs. 2 and 3. Thus in the die 20 the blank is initially formed with an unreduced head portion 10, a tapered portion 11, a shank portion 9 of a diameter substantially equal to the overall diameter of the threads of the finished bolt, and an end shank portion 9a of a diameter substantially equal to the pitch diameter of the threads of the completed bolt. From the die 20, the blank may be transferred to a die substantially similar to the die 17, where the shank portion 9 of the blank may be reduced throughout its length, including the tapered portion 11, to the diameter of the shank end 9a and at the same time the head of the blank may be upset to the desired shape. In this final extrusion operation, the end portion 9a fits the bore of the die 17 and thereby serves as a guide and axially alining means for the shank portion 9.

Fig. 5 shows the regular contour of the grain structure of bolts produced by the present process, there being no re-entrant curves resulting from successive upsetting operations on the head of the blank. The shank 9a may be threaded the full length thereof, which would not be true in the case of a blank having a shank of a contour such as that shown in Fig. 3a, which contour follows that of blanks produced by the extrusion method prior to the present improved method.

Certain forms of the invention have been described in considerable detail merely for the purpose of illustration and not with the desire to be limited thereto, since it is appreciated that many variations of the means and methods described may be resorted to without departing from the scope of the following claims. For instance, the heads may be completely formed prior to the last extrusion step and thus the apparatus employed to carry out the method may vary from that shown and described. Alternatively, since the die shown in Figure 6 wherein a portion of the stock is reduced to pitch diameter in one step produces an article which requires only heading, or heading and trimming to complete a useful type of bolt blank, this die permits a bolt forming method wherein the extrusion dies are not subjected to the heading pressure of the blank.

I claim:

1. The method of making headed blanks for bolts and analogous screw-threaded articles which includes the following steps: extruding a portion of a length of stock to form a blank having a threading portion of reduced diameter and a head portion, the blank resulting from such extrusion having an annular portion at the joint between the head portion and said extruded portion, upsetting the head portion to form a head, and subjecting the headed blank to a further extrusion operation to reduce said annular portion to the diameter of the said extruded portion.

2. The method of making headed blanks for bolts and analogous screw-threaded articles which includes the following steps: extruding a portion of a length of stock to form a threading portion and a head portion, the blank resulting from such extrusion having an annular portion at the joint between the head portion and said extruded portion, upsetting the head portion by a single blow to form a head, and subjecting the headed blank to a further extrusion operation to reduce said annular portion to the diameter of the said extruded portion and simultaneously trimming said head to the desired polygonal form.

3. The method of making headed blanks for bolts and analogous screw-threaded articles, which comprises: reducing a portion of a length of stock of cross-sectional area greater than that of the shank of the blank to form a round cross section of a diameter equal approximately to the overall diameter of the threads of the finished article, further reducing a portion of said round cross section to a diameter equal approximately to the pitch diameter of the threads, upsetting the unreduced portion of the stock to form a head, and reducing the joint portion of the blank between the shank and head to the diameter of the shank.

4. The method of making headed blanks for bolts and analogous screw-threaded articles which comprises: extruding a portion of a length of stock of cross-sectional area greater than that of the shank of the blank to form a threading shank length of round cross section of a diameter equal approximately to the overall diameter of the threads of the finished article, further extruding the greater portion of said previously extruded shank length to a diameter equal to the pitch diameter of the threads and upsetting the unreduced portion of the stock to form a head, and extruding the remaining portion of the shank length to the pitch diameter of the threads.

5. The method of making headed blanks for bolts and analogous screw-threaded articles which comprises: extruding a portion of a length of stock of cross-sectional area greater than that of the shank of the blank to form a threading shank length of round cross section of a diameter equal to the overall diameter of the threads of the finished article, further extruding the greater portion of said previously extruded shank length to a diameter equal to the pitch diameter of the threads and upsetting the unreduced portion of the stock to form a head, and thereafter extruding the remaining portion of the shank length to the pitch diameter of the threads and simultaneously trimming the head of the blank.

6. As an article of manufacture, a bolt having a shank extruded throughout its entire length said shank being of equal diameter throughout its length and an upset head formed by a single upsetting blow, said head having a grain structure embodying fibers or flow lines conforming to the contour thereof and free from re-entrant bends and having a diameter greater with respect to the diameter of the shank than can be successfully produced by a single upsetting blow on material of shank diameter.

7. The method of making headed blanks for bolts and the like which comprises extruding and upsetting a length of stock to form a blank having an upset head, an intermediate cylindrical portion of smaller diameter than the head, and a shank portion of smaller diameter than the intermediate portion, and further extruding the blank to reduce the diameter of the intermediate portion to the diameter of the shank portion.

8. The method of making headed blanks for bolts and the like which comprises extruding and upsetting a length of stock to form a blank having an upset head, an intermediate cylindrical portion of smaller diameter than the head, and a shank portion of smaller diameter than the intermediate portion, and forcing the blank into an extrusion die having an extrusion throat with its smallest diameter equal to the diameter of said shank portion to extrude the remaining length of said intermediate portion to the diameter of said shank portion.

9. The method of making headed blanks for bolts and the like which comprises acting upon a length of stock by operations, including extrusion and upsetting a head in a single blow, to form a blank having a single blow upset head, an intermediate portion of smaller diameter than the head, and a shank portion of smaller diameter than the intermediate portion, and further extruding the blank to reduce the intermediate portion to the diameter of the shank portion.

10. As an article of manufacture, a bolt having a shank extruded throughout its entire length, said shank being of equal diameter and adapted to have threads rolled thereon throughout its length and an upset head formed by a single upsetting blow, said head having a diameter greater with respect to the diameter of the shank than can be successfully produced by a single blow on material of shank diameter.

11. A bolt having a shank extruding throughout its entire length and being of equal diameter throughout its length and an upset head formed by a single upsetting blow, said head having a diameter greater than can be successfully produced by a single upsetting blow on material of shank diameter.

12. A bolt comprising a shank twice extruded throughout its length and a head upset from unextruded stock.

13. A bolt comprising a shank twice extruded throughout its length and adapted to have threads rolled thereon throughout its length and a head upset from unextruded stock.

14. That method of making bolts and the like which comprises forcing a bolt blank into an extrusion die to extrude a portion of the length of the blank, guiding said blank during said extrusion by co-operating cylindrical surfaces on the blank and a die, forcing said extruded blank into a second extrusion die to further reduce said first extruded portion, guiding said blank during said second extrusion by co-operating cylindrical surfaces on the extruded blank and the die, forcing said blank into a third extrusion die to extrude a portion of the blank unextruded during the second extrusion and guiding said blank during said third extrusion by co-operating cylindrical surfaces on the blank and die.

15. In a bolt machine, a bolt blank forming die having a bore of substantially blank stock diameter adjacent the face of the die, said bore terminating in a bevel-faced extrusion throat, a bore extending axially from said extrusion throat and terminating in a second bevel faced extrusion throat of less diameter than said first extrusion throat and corresponding to the shank diameter of the extruded bolt blank and a cylindrical shank receiving bore extending from said last named extrusion throat.

16. As an article of manufacture, a bolt having a head and shank, said shank twice extruded throughout its length and of equal roll threading diameter substantially to the base of the head, said head upset from stock having a greater diameter than said twice extruded shank and a grain structure characterized by lack of re-entrant curves.

17. A bolt comprising an extruded shank adapted to have have rolled threads formed thereon throughout its entire length and an upset head formed by a single upsetting blow, said head having a diameter greater with respect to said shank than can be produced on stock material having a diameter equal to the pitch diameter of said threads by a single upsetting blow.

18. That method of making bolts and the like which comprises moving a blank axially through a pair of spaced extrusion throats, simultaneously extruding said blank through a length thereof in the first of said extrusion throats and further extruding a portion of said length in the second of said extrusion throats and thereby further reducing a part of the blank to the pitch diameter of the threads to be formed on the bolt.

19. That method of making bolts and the like which comprises moving a blank axially through a pair of spaced extrusion throats, simultaneously extruding said blank through a length thereof in the first of said extrusion throats and further extruding a portion of said length in the second of said extrusion throats and thereby further reducing a part of the blank to the pitch diameter of the threads to be formed on the bolt, and then further extruding the remainder of the shank forming portion of the blank to said pitch diameter.

20. That method of making a bolt blank having an upset head and a rolled thread receiving shank of uniform diameter throughout its length corresponding to the pitch diameter of the rolled threads in the finished article including the steps of moving a length of stock into a die, guiding said length of stock in its movement into the die by a cylindrical die portion of stock diameter, continuing the movement of the blank to force the same through extrusion means in said die to reduce a portion of said length of stock to said pitch diameter and leaving a portion of said length of stock unreduced in said cylindrical die portion, removing said extruded blank from said die and with a single blow upsetting the unreduced portion of said blank to form an upset full sized head of greater diameter than can be successfully produced by a single upsetting blow upon stock material of said pitch diameter.

21. That method of making a bolt blank having a single blow full sized upset head and a rolled thread receiving shank of uniform diameter throughout its length corresponding to the pitch diameter of the rolled threads in the finished article, comprising extruding that part of a length of stock which forms the entire length of the shank in the finished article to a diameter corresponding to said pitch diameter, without reducing the diameter of the remainder of said length of stock, and with a single blow upsetting all of the remainder of said length of stock to form an upset full sized head of greater diameter than can be successfully produced by a single blow upon stock material of said pitch diameter.

22. Apparatus for making bolt blanks having a single blow upset head and a rolled thread receiving shank of uniform diameter throughout corresponding to the pitch diameter of the rolled threads in the finished article comprising a die having a cylindrical portion immediately adjacent the face of the die having a diameter corresponding to the bolt blank stock diameter, a second cylindrical die portion inwardly thereof, and spaced with respect to said first named cylindrical portion, corresponding to said pitch diameter, and extrusion throat means arranged intermediate said two cylindrical portions adapted to reduce the stock material moved into the die from said stock diameter to said pitch diameter, said first named cylindrical portion proportioned axially and diametrically with respect to said pitch diameter to receive a volume of unreduced stock adapted to be upset by a single upsetting blow to form a full sized head of greater diameter than can be successfully produced by a single upsetting blow upon stock material of said pitch diameter.

JOHN H. FRIEDMAN.